United States Patent
Tahara

(10) Patent No.: US 11,749,458 B2
(45) Date of Patent: Sep. 5, 2023

(54) CERAMIC ELECTRONIC DEVICE AND MANUFACTURING METHOD OF CERAMIC ELECTRONIC DEVICE

(71) Applicant: TAIYO YUDEN CO., LTD., Tokyo (JP)

(72) Inventor: Mikio Tahara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/584,964

(22) Filed: Jan. 26, 2022

(65) Prior Publication Data
US 2022/0246355 A1    Aug. 4, 2022

(30) Foreign Application Priority Data
Feb. 3, 2021 (JP) .................................. 2021-016082

(51) Int. Cl.
  *H01G 4/248*    (2006.01)
  *H01G 4/30*     (2006.01)
  *H01G 4/252*    (2006.01)

(52) U.S. Cl.
  CPC ............. *H01G 4/248* (2013.01); *H01G 4/252* (2013.01); *H01G 4/30* (2013.01)

(58) Field of Classification Search
  None
  See application file for complete search history.

(56) References Cited

U.S. PATENT DOCUMENTS

| | | | | |
|---|---|---|---|---|
| 9,343,229 | B2* | 5/2016 | Kim | H01G 4/012 |
| 2012/0194031 | A1* | 8/2012 | Ogawa | H01G 4/005 336/200 |
| 2015/0021073 | A1* | 1/2015 | Kim | H01G 4/12 174/258 |
| 2019/0180938 | A1* | 6/2019 | Tahara | H01G 4/248 |
| 2019/0378655 | A1* | 12/2019 | Iwai | H01G 4/248 |
| 2020/0075260 | A1* | 3/2020 | Yun | H01G 4/30 |

(Continued)

FOREIGN PATENT DOCUMENTS

| | | |
|---|---|---|
| JP | 2001210545 A | 8/2001 |
| JP | 2006310700 A | 11/2006 |

(Continued)

*Primary Examiner* — Dion R. Ferguson
(74) *Attorney, Agent, or Firm* — Law Office of Katsuhiro Arai

(57) ABSTRACT

A ceramic electronic device includes a multilayer chip including a multilayer structure, a first cover layer and a second cover layer and having a parallelepiped shape, the multilayer structure having a structure in which each of a plurality of dielectric layers and each of a plurality of internal electrode layers are alternately stacked and are alternately exposed to a first end face and a second end face of the multilayer chip, the first end face being opposite to the second end face, the first cover layer being provided on an upper face of the multilayer structure in a stacking direction, the second cover layer being provided on a lower face of the multilayer structure, a first external electrode formed on the first end face, and a second external electrode formed on the second end face. In this structure, a relationship of $0.20 \leq R1/\sqrt{(P1^2 - C1^2)} \leq 0.80$ is satisfied.

7 Claims, 13 Drawing Sheets

(56) References Cited

U.S. PATENT DOCUMENTS

2020/0152390 A1* 5/2020 Yeon .................. H01G 4/012
2020/0152391 A1* 5/2020 Kang .................. H01G 4/12
2022/0246355 A1* 8/2022 Tahara ................ H01G 4/248

FOREIGN PATENT DOCUMENTS

JP       2019102766 A     6/2019
KR    20200027864 A *  3/2020

* cited by examiner

CERAMIC ELECTRONIC DEVICE AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2021-016082, filed on Feb. 3, 2021, the entire contents of which are incorporated herein by reference.

FIELD

A certain aspect of the present invention relates to a ceramic electronic device and a manufacturing method of a ceramic electronic device.

BACKGROUND

Ceramic electronic device such as multilayer ceramic capacitors have a multilayer chip in which each of a plurality of dielectric layers of which a main component is ceramic and each of plurality of internal electrode layers are alternately stacked. The internal electrode layers are extracted to end faces of the multilayer chip. External electrode covers the end faces (for example, see Japanese Patent Application Publication No. 2019-102766, Japanese Patent Application Publication No, 2001-210545, and Japanese Patent Application Publication No, 2006-310700).

SUMMARY OF THE INVENTION

Stress caused by thermal expansion coefficient difference between the external electrodes and the ceramic portion tends to be concentrated in corner portions of the multilayer chip. Therefore, crack may occur in the corner portions of the multilayer chip. Accordingly, it is though that the stress is released. However, in this case, reliability may be degraded.

According to an aspect of the present invention, there is provided a ceramic electronic device including: a multilayer chip including a multilayer structure, a first cover layer and a second cover layer and having a parallelepiped shape, the multilayer structure having a structure in which each of a plurality of dielectric layers and each of a plurality of internal electrode layers are alternately stacked and are alternately exposed to a first end face and a second end face of the multilayer chip, the first end face being opposite to the second end face, the first cover layer being provided on an upper face of the multilayer structure in a stacking direction, the second cover layer being provided on a lower face of the multilayer structure; a first external electrode formed on the first end face; and a second external electrode formed on the second end face, wherein a relationship of $0.20 \leq R1/\sqrt{(P1^2-C1^2)} \leq 0.80$ is satisfied when a direction in which the first end face is opposite to the second end face is an X-axis direction, the stacking direction is a Z-axis direction, and a direction vertical to the X-axis direction and the Z-axis direction is a Y-axis direction, a curvature radius of a corner portion of the first cover layer on a side of the first external electrode in a cross section in a XZ-plane passing through a center in the Y-axis direction of the multilayer chip is a curvature radius R1, a straight line obtained by connecting edges of internal electrode layers on s side of the first external electrode not connected to the first external electrode is a straight line L, an intersection of the straight line L and an internal electrode layer that is closest to the first cover layer is an intersection point N1, a straight line drawn in the X-axis direction so as to contact an upper face of the multilayer chip is a straight line M, a straight line drawn in the Z-axis direction so as to contact the first end face is a straight line N, an intersection point of the straight line M and the straight line N is an intersection point O, a minimum distance between the intersection point N1 and the straight line M is a distance C1 and a minimum distance between the intersection point N1 and the intersection point O is a distance P1.

A manufacturing method of a ceramic electronic device includes: forming a ceramic multilayer structure having a parallelepiped shape, by stacking a plurality of pattern-formed sheets in each of which a conductive paste for forming internal electrode layers is printed on a dielectric green sheet including ceramic, each of a plurality of conductive pastes for forming internal electrode layers being alternately exposed to a first end face and a second end face of the ceramic multilayer structure, and by providing a first cover sheet including ceramic on an upper face of the ceramic multilayer structure in a stacking direction of the ceramic multilayer structure and providing a second cover sheet including ceramic on a lower face of the ceramic multilayer structure; polishing corner portions of the ceramic multilayer structure; painting a first conductive paste for forming the first external electrode on the first end face; painting a second conductive paste for forming the second external electrode on the second end face; forming a dielectric layer from the dielectric green sheet, an internal electrode layer from the conductive paste for forming internal electrode layers, a first cover layer from the first cover sheet, a second cover layer from the second cover sheet, a first external electrode from the first conductive paste for forming the first external electrode, and a second external electrode from the second conductive paste for forming the second external electrode by firing the ceramic multilayer structure, the first conductive paste for forming the first external electrode and the second conductive paste for forming the second external electrode, wherein the corner portions of the ceramic multilayer structure are polished so that a relationship of $0.20 \leq R1/\sqrt{(P1^2-C1^2)} \leq 0.80$ is satisfied when a direction in which the first end face is opposite to the second end face is an X-axis direction, a stacking direction is a Z-axis direction, and a direction vertical to the X-axis direction and the Z-axis direction is a Y-axis direction, a curvature radius of a corner portion of the first cover layer on a side of the first external electrode in a cross section in a XZ-plane passing through a center in the Y-axis direction of a multilayer chip formed from the ceramic multilayer structure is a curvature radius R1, a straight line obtained by connecting edges of internal electrode layers on s side of the first external electrode not connected to the first external electrode is a straight line L, an intersection of the straight line L and an internal electrode layer that is closest to the first cover layer is an intersection point N1, a straight line drawn in the X-axis direction so as to contact an upper face of the multilayer chip is a straight line M, a straight line drawn in the Z-axis direction so as to contact the first end face is a straight line N, an intersection point of the straight line M and the straight line N is an intersection point O, a minimum distance between the intersection point N1 and the straight line M is a distance C1 and a minimum distance between the intersection point N1 and the intersection point O is a distance P1.

DETAILED DESCRIPTION

A description will be given of an embodiment with reference to the accompanying drawings.

Embodiment

Figure 1:
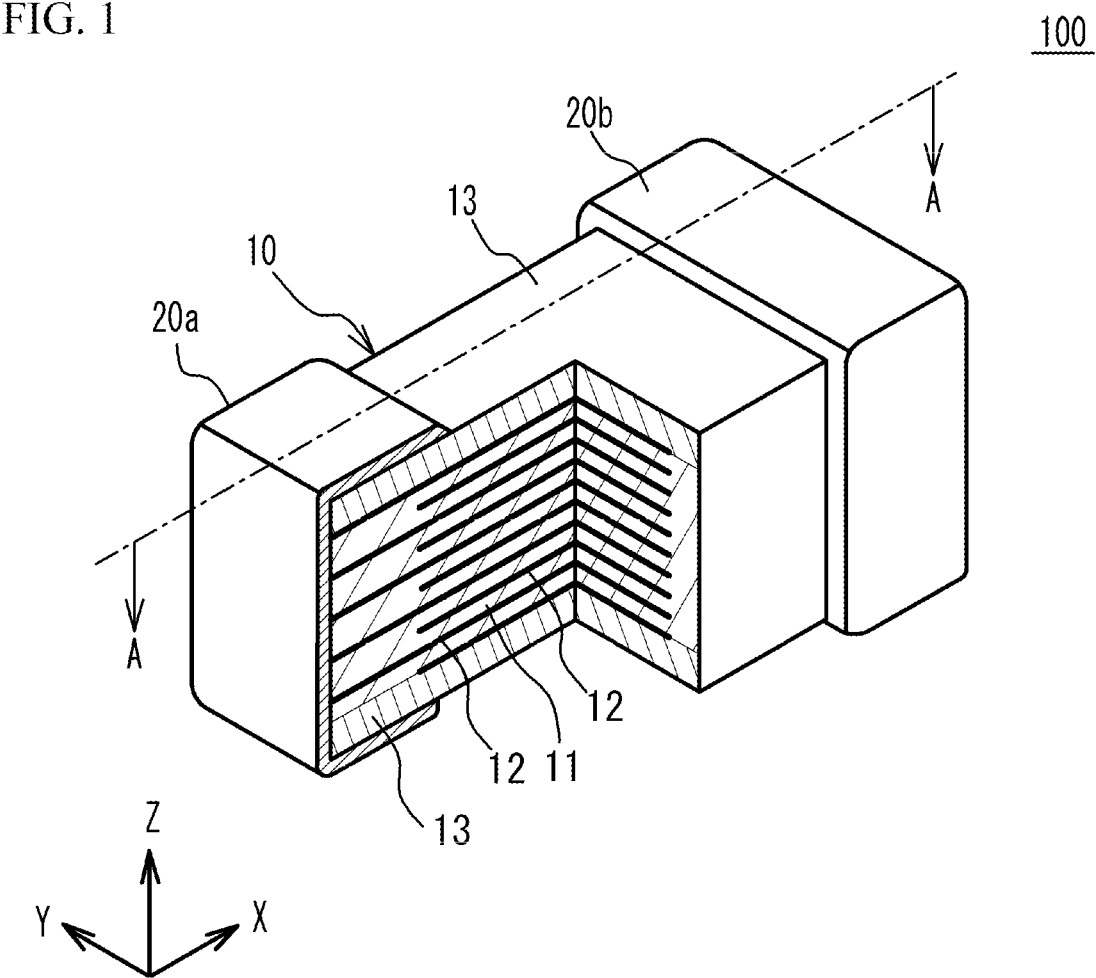
FIG. 1 illustrates a perspective view of a multilayer ceramic capacitor in which a cross section of a part of the multilayer ceramic capacitor is illustrated.

A description will be given of a multilayer ceramic capacitor. FIG. 1 illustrates a partial perspective view of a multilayer ceramic capacitor 100 in accordance with an embodiment. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. An upper face of the multilayer chip 10 in a stacking direction is referred to as an upper face. A lower face of the multilayer chip 10 in the stacking direction is referred to as a lower face. Two faces other than the two edge faces, the upper face and the lower face of the multilayer chip 10 are referred to as side faces. The external electrodes 20a and 20b extend to the upper face, the lower face and the two side faces. However, the external electrodes 20a and 20b are spaced from each other on the upper face, the lower face and the two side faces.

In FIG. 1, an X-axis direction (first direction) is a length direction of the multilayer chip 10. In the X-axis direction, the two end faces of the multilayer chip 10 are opposite to each other. Moreover, in the X-axis direction, the external electrode 20a is opposite to the external electrode 20b. A Y-axis direction (second direction) is a width direction of internal electrode layers. A Z-axis direction is the stacking direction. In the Z-axis direction, the upper face and the lower face of the multilayer chip 10 are opposite to each other. The X-axis direction, the Y-axis direction and the Z-axis direction are vertical to each other.

The multilayer chip 10 has a structure designed to have dielectric layers 11 and internal electrode layers alternately stacked. A main component of the dielectric layer 11 is a ceramic material acting as a dielectric material. A main component of the internal electrode layers is a metal material such as a base metal material. End edges of the internal electrode layers are alternately exposed to a first end face of the multilayer chip 10 and a second end face of the multilayer chip 10 that is different from the first end face. In the embodiment, the first end face faces the second end face. The external electrode 20a is provided on the first end face. The external electrode 20b is provided on the second end face. Thus, the internal electrode layers are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer. In a multilayer structure of the dielectric layers 11 and the internal electrode layers, two of the internal electrode layers are positioned at outermost layers in a stacking direction. The upper face of the multilayer structure is covered by a cover layer 13 (first cover layer). The lower face of the multilayer structure is covered by another cover layer 13 (second cover layer). A main component of the cover layers 13 is a ceramic material. For example, a main component of the cover layers 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 1.6 mm, a width of 0.8 mm and a height of 0.8 mm. The multilayer ceramic capacitor 100 may have a length of 2.0 mm, a width of 1.25 mm and a height of 1.25 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. An average thickness of the internal electrode layer 12 is, for example, 1 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. An average thickness of the dielectric layer 11 is, for example, 1 μm or less. The number of stack number of the internal electrode layers is, for example, 100 to 800.

Figure 2:
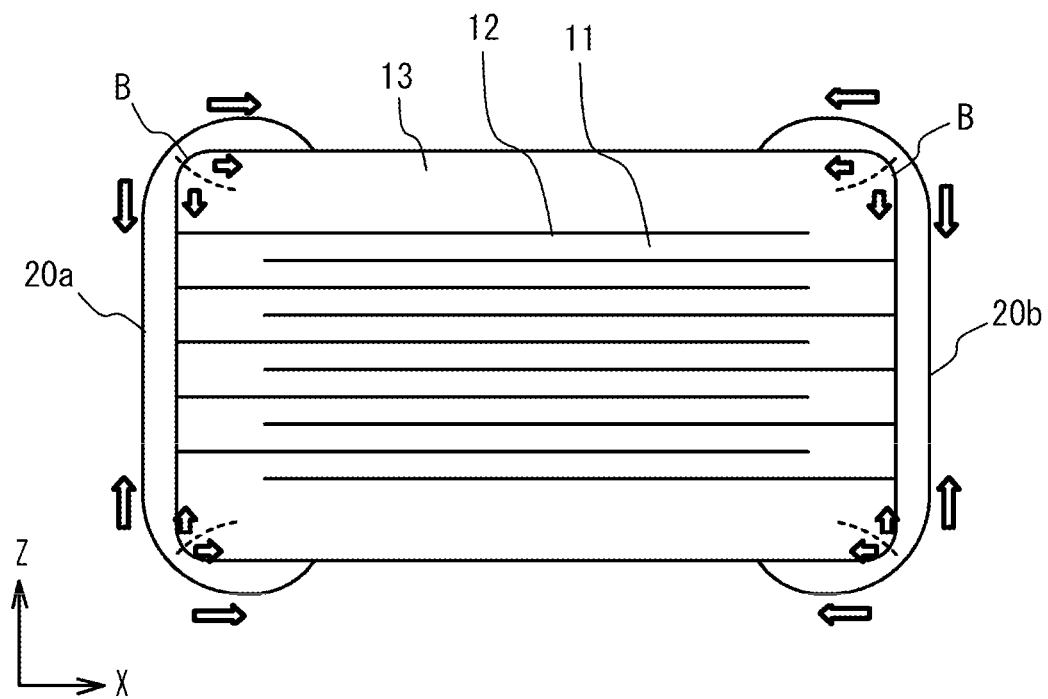
FIG. 2 illustrates a cross section taken along a line A-A of FIG. 1.

FIG. 2 illustrates a cross sectional view of FIG. 1 taken along a line A-A of FIG. 1. In FIG. 2, hatch is omitted. There is difference of a thermal expansion coefficient between each of the external electrodes 20a and 20b, and each of ceramic portions contacting each of the external electrodes 20a and 20b. As illustrated in FIG. 2, the external electrodes 20a and 20b contract on the corner portions B (round corners) in a large arrow direction. In this case, stress is concentrated on the corner portions B of the cover layer 13 in a small arrow direction. Because of the stress, crack illustrated with a dotted line of FIG. 2 may occur. When the crack occurs, poor appearance or degradation of the reliability may occur.

Accordingly, it is thought that the crack may be suppressed by releasing the stress concentrated on the corner portions B. For example, it is thought that the thickness of the external electrodes on the corner portions B is reduced. However, in this case, insulation characteristic may be degraded because of degradation of resistance to humidity. In this manner, the reliability of the multilayer ceramic capacitor 100 may be degraded.

Accordingly, the multilayer ceramic capacitor 100 has a structure for securing the reliability and suppressing the crack.

Figure 3A:
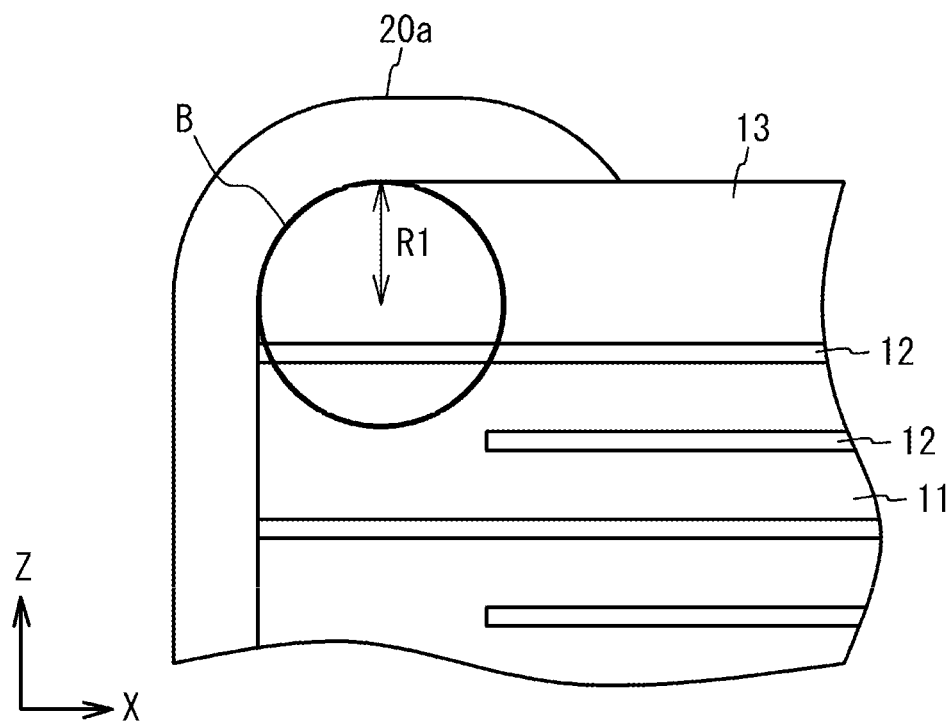
FIG. 3A illustrates a curvature radius.
Figure 3B:
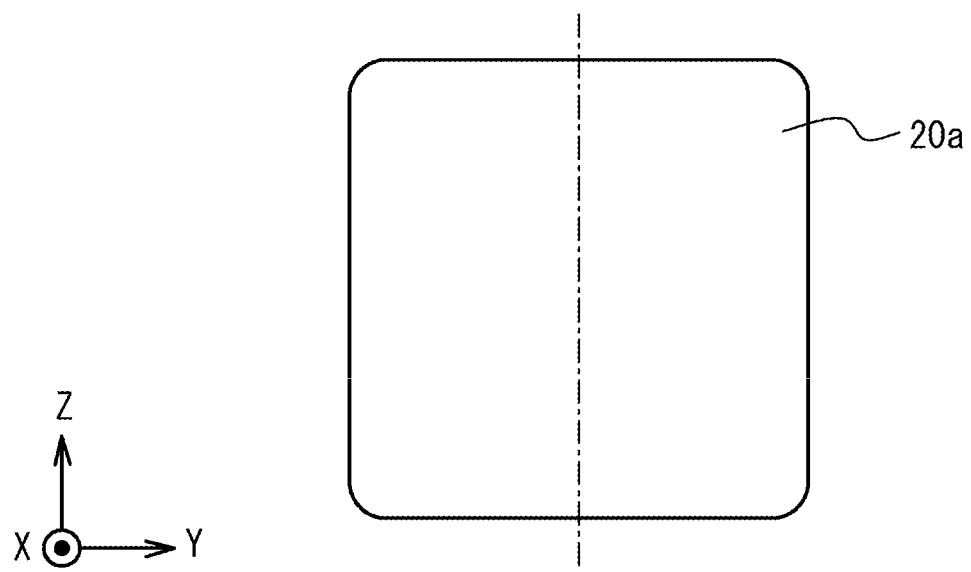
FIG. 3B illustrates a position of a cross section.
Figure 4A:
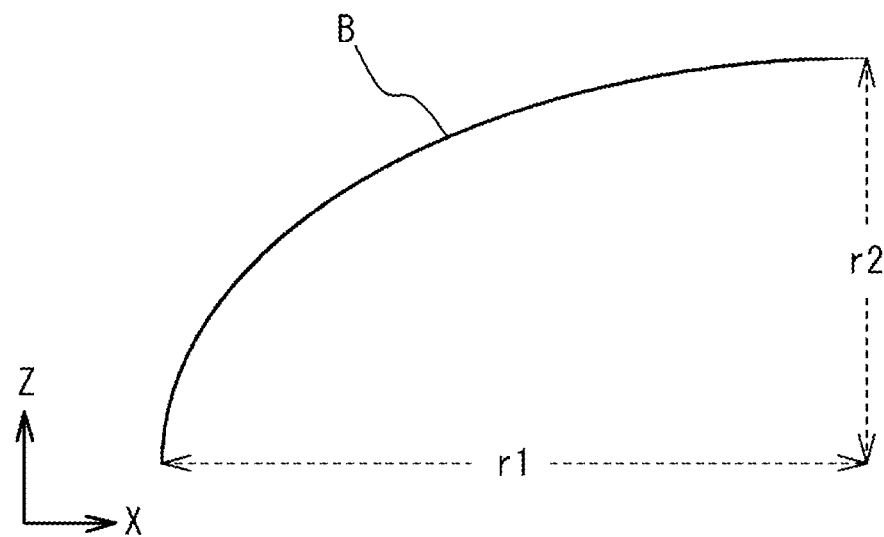
FIG. 4A and FIG. 4B illustrate a curvature radius.
Figure 4B:
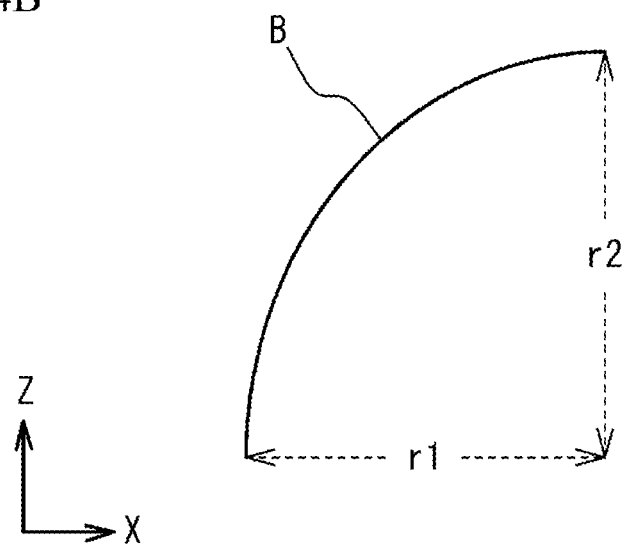

The corner portion of the embodiment is a portion having a curvature in the corner of the multilayer chip 10 (corner of the cover layer 13). As illustrated in FIG. 3A, one of two side faces of the multilayer chip 10 is arranged upside and buried in a lateral direction. A cross section is exposed by grinding until the center of the multilayer chip 10. A curvature radius of the cross section is defined as the curvature radius R1. As illustrated in FIG. 3B, the cross section is a cross section in the XZ plane (dashed line) in the center in the Y-axis direction in the multilayer chip 10. In FIG. 3A, hatch is omitted. The corner portion B may not necessarily have a circular arc shape, as illustrated in FIG. 4A or FIG. 4B. In this case, the curvature radius R1 can be defined as an average value (=(r1+r2)/2) of a length r1 of the corner portion B in the X-axis direction and a length r2.

The embodiment focuses on a distance between the internal electrode layer 12 and the corner portion B. A shape of the corner portion B is regulated.

Figure 5:
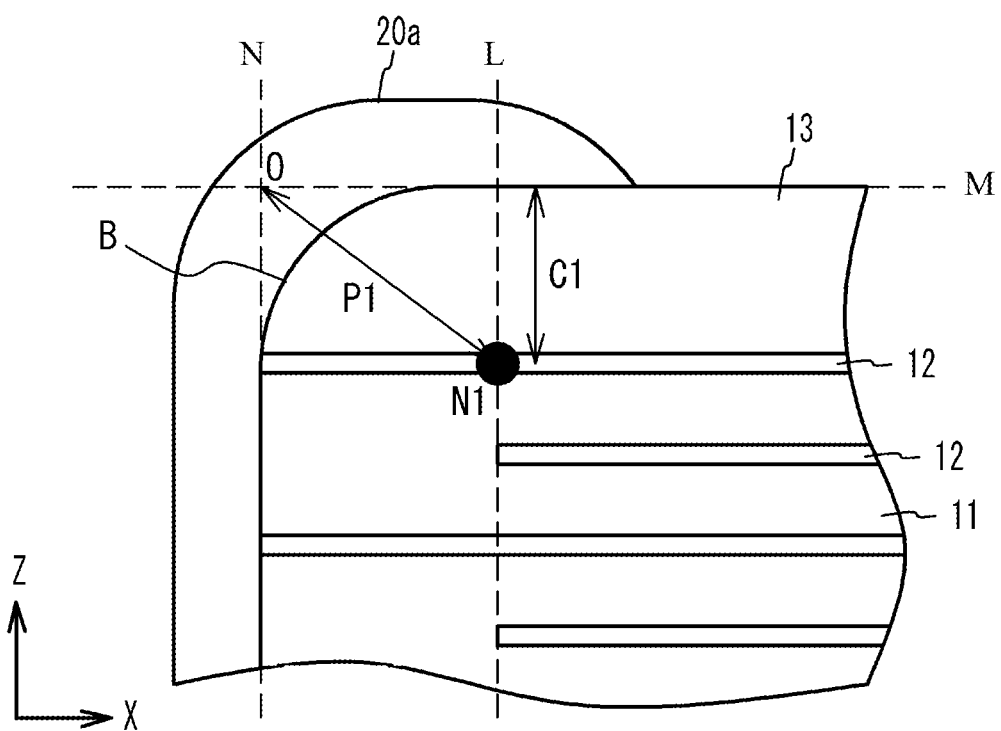
FIG. 5 illustrates each position and each distance of each portion of a multilayer ceramic capacitor.

FIG. 5 illustrates each position of each portion and each distance of each portion of the multilayer ceramic capacitor 100. FIG. 5 illustrates a cross sectional view around the external electrode 20a and the upper face of the multilayer chip 10. The cross section of FIG. 5 is a cross section of the XZ plane in a center of the Y-axis direction, as well as the cross section of FIG. 3B. In FIG. 5, hatch is omitted.

In the cross section of FIG. 5, the curvature radius R1 is a curvature radius of the same shape as the corner portion of the cover layer 13 on the upper face side of the multilayer chip 10, on the side of the external electrode 20a. A line which is obtained by connecting edges on the side of the external electrode 20a of the internal electrode layers 12 not connected to the external electrode 20a is defined as a straight line L. An intersection point N1 is defined as an intersection point of the straight line L and the uppermost internal electrode layer 12 of the multilayer chip 10. In the cross section of FIG. 5, a straight line M and a straight line N are drawn along the external circumference of the multilayer chip 10. The straight line M is drawn in the X-axis direction so as to contact the upper face of the multilayer chip. The straight line N is obtained by drawing a straight line in the Z-axis direction so as to contact the end face of the multilayer chip 10 on the side of the external electrode 20a. An intersection point of the straight line M and the straight line N is an intersection point O. A minimum distance between the intersection point N1 and the straight line M is defined as a distance C1. A minimum distance between the intersection point N1 and the intersection point O is defined as a distance P1.

Figure 6:
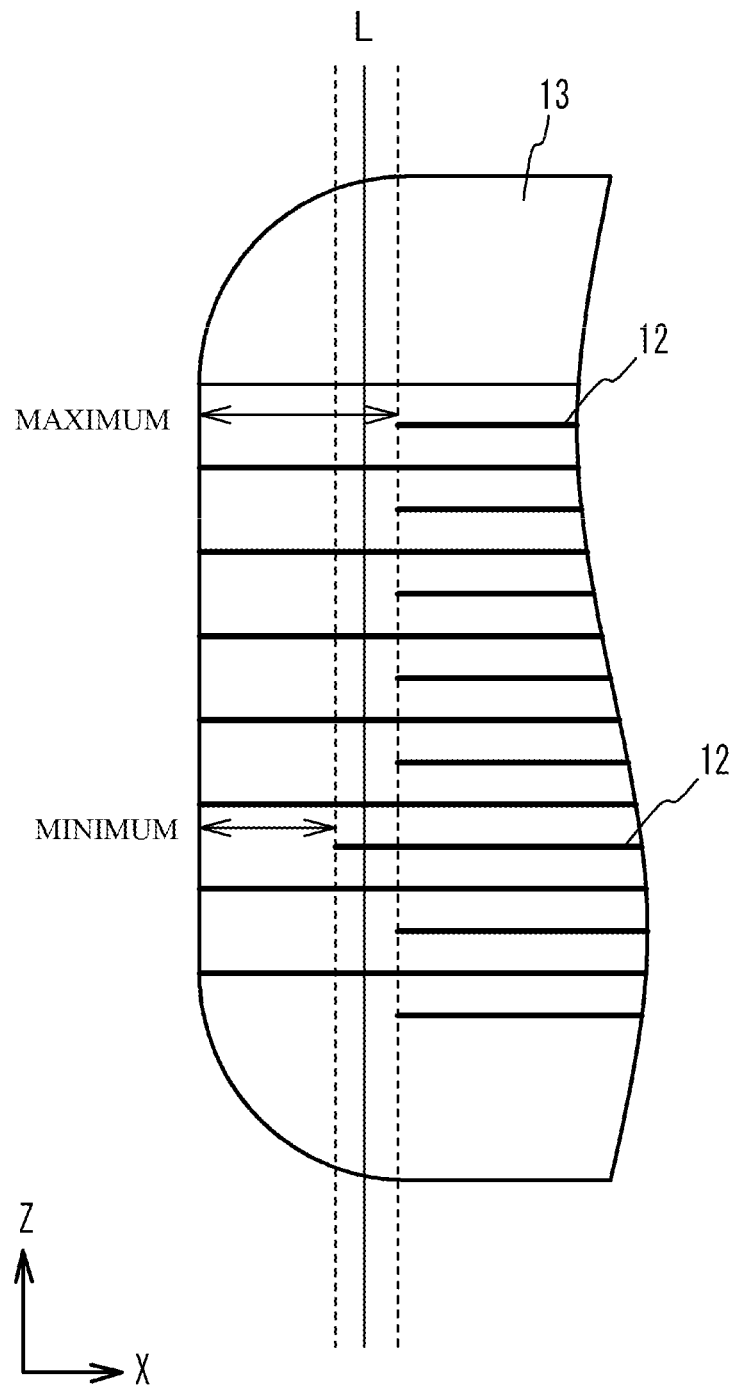
FIG. 6 illustrates a straight line L.

When the edges of the internal electrode layers 12 not connected to the external electrode 20a on the side of the external electrode 20a coincide with each other in the X-axis direction, the straight line is in parallel with the Z-axis direction. When the edges of the internal electrode layers 12 not connected to the external electrode 20a do not coincide with each other in the X-axis direction, the straight line L is defined as a straight line which is in parallel with the Z-axis and passes through a center point between the edges of the internal electrode layers 12 of which a distance from the non-exposed edges is a maximum and the edges of the internal electrode layers 12 of which the distance from the non-exposed edges is a minimum, as illustrated in FIG. 6.

The intersection point N1 corresponds to a corner of capacity section (crossing section of internal electrode layers) in which the internal electrode layers 12 connected to the external electrode 20a and the internal electrode layers 12 connected to the external electrode 20b cross each other. In the crossing section of internal electrode layers is a section of which a density of internal electrode layers of which a main component is metal is higher than other sections. Therefore, a difference of thermal expansion coefficients of the crossing section of internal electrode layers and the external electrodes is relatively small. When the curvature radius R1 is small, a distance between the corner portion B and the intersection point N1 is large. Moreover, a distance between the external electrode 20a and the crossing section of internal electrode layers is large. In this case, crack may occur in a firing process because of stress caused by the thermal expansion difference between the external electrode 20a and a ceramic portion contacting the external electrode 20a on the corner portion. On the other hand, when the curvature radius R1 is large, the distance between the corner portion B and the intersection point N1 is small. In this case, the occurrence of the crack is suppressed in the firing process, because the thermal expansion difference between the external electrode 20a and the ceramic portion contacting the external electrode 20a on the corner portion. On the other hand, when the distance between the corner portion B and the intersection point N1 is small, an amount of a ceramic portion protecting the crossing portion of internal electrode layers is small. In this case, the reliability may be degraded because of degradation of insulation characteristic caused by degradation of resistance to humidity.

The present inventors have found that the reliability can be secured and the occurrence of crack can be suppressed, when the relationship among the curvature radius R1, the distance C1 and the distance P1 is rationalized and the relationship of $R1/\sqrt{(P1^2-C1^2)} \leq 0.80$ is satisfied.

From a viewpoint of suppressing the occurrence of crack by reducing the distance between the corner portion B and the intersection point N1, it is preferable that $R1/\sqrt{(P1^2-C1^2)}$ is 0.20 or more. It is more preferable that $R1/\sqrt{(P1^2-C1^2)}$ is 0.25 or more. On the other hand, from a viewpoint of improving the reliability by increasing the distance between the corner portion B and the intersection point N1, it is preferable that $R1/\sqrt{(P1^2-C1^2)}$ is 0.80 or less. It is more preferable that $R1/\sqrt{(P1^2-C1^2)}$ is 0.75 or less.

From a viewpoint of suppressing the occurrence of discontinuous portion in the part of the external electrode on the corner portion, it is preferable that the curvature radius R1 is 1% or more of the size of the multilayer chip 10 in the longitudinal direction (X-axis direction of FIG. 1). It is more preferable that the curvature radius R1 is 3% or more of the size in the longitudinal direction. It is still more preferable that the curvature radius R1 is 5% or more of the size in the longitudinal direction. From a viewpoint of suppressing standing of the chip during mounting on a substrate, it is preferable that the curvature radius R1 is 20% or less of the size of the multilayer chip 10 in the longitudinal direction. It is more preferable that the curvature radius R1 is 15% or less of the size in the longitudinal direction. It is still more preferable that the curvature radius r1 is 10% or less of the size in the longitudinal direction.

When the distance C1 is excessively large, the crack may occur. Accordingly, it is preferable that the distance C1 has an upper limit. For example, it is preferable that the distance C1 is 35% or less of the size of the multilayer chip 10 in a height direction (the Z-axis of FIG. 1). It is more preferable that the distance C1 is 30% or less. It is more preferable that the distance C1 is 25% or less.

On the other hand, when the distance C1 is excessively small, the reliability may be insufficient. Accordingly, it is preferable that the distance C1 has a lower limit. For example, it is preferable that the distance C1 is 3% or more of the size of the multilayer chip 10 in the height direction. It is more preferable that the distance C1 is 5% or more. It is still more preferable that the distance C1 is 10% or more.

When the distance P1 is excessively large, the crack may occur. Accordingly, it is preferable that the distance P1 has an upper limit. For example, it is preferable that the distance P1 is 45% or less of the size of the multilayer chip 10 in the height direction. It is more preferable that the distance P1 is 40% or less. It is still more preferable that the distance is 35% or less.

On the other hand, when the distance P1 is excessively small, the reliability may be insufficient. Accordingly, it is preferable that the distance P1 has a lower limit. For example, it is preferable that the distance P1 is 10% or more of the size of the multilayer chip 10 in the height direction. It is more preferable that the distance P1 is 15% or more. It is still more preferable that the distance P1 is 20% or more.

Figure 7:
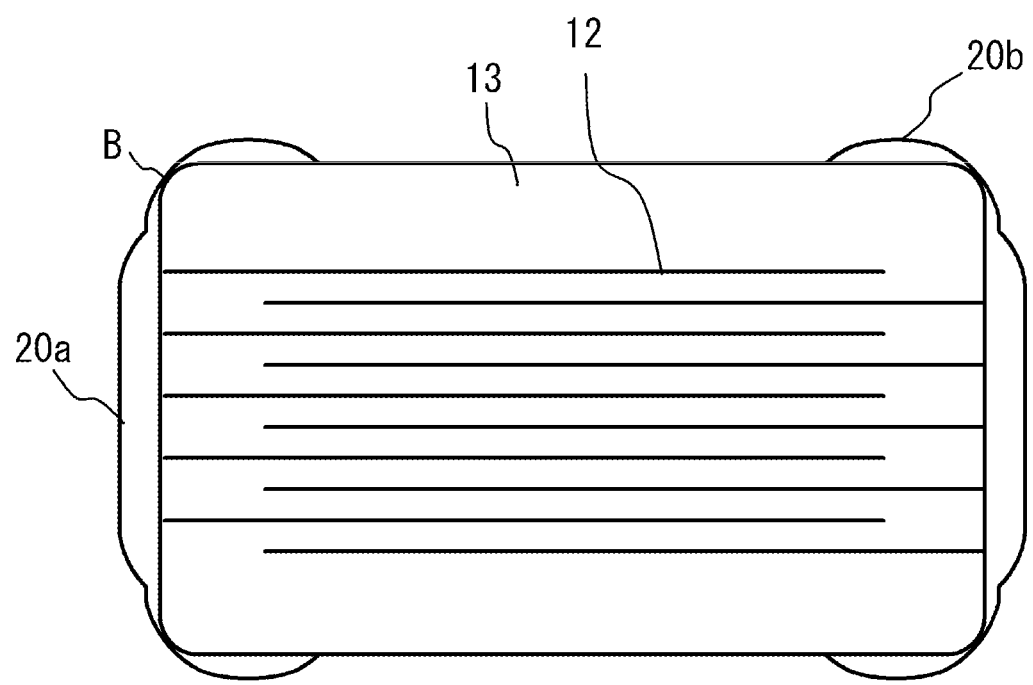
FIG. 7 illustrates an inflection point (level difference) of an external electrode.

In the structure of the embodiment, it is not necessary to reduce the thickness of the external electrode 20a on the corner portion. It is therefore possible to evenly form a plated layer on the external electrode 20a. In particular, when the level difference (inflection point) illustrated in FIG. 7 is not formed, it is possible to evenly form a plated layer.

For example, it is preferable that the minimum thickness of the external electrode 20a on the corner portion B of the multilayer chip 10 is 1 μm or more. It is more preferable that the thickness is 2 μm or more. It is still more preferable that the thickness is 3 μm or more. However, when the external electrode 20a is totally thick, the multilayer chip 10 becomes large. It is therefore preferable that the local maximum thickness of the external electrode 20a is 10 μm or less. It is more preferable that the local maximum thickness is 8 μm or less. It is still more preferable that the local maximum thickness is 5 μm or less.

The stack number of the internal electrode layers 12 in the multilayer chip 10 may be 500 layers/mm or more and 1500 layers/mm or less in the height direction of the multilayer chip 10. Alternatively, the stack number may be 800 layers/mm or more and 1000 layers/mm or less. The thickness of the internal electrode layers 12 may be 0.1 μm or more and 0.5 μm or less. The thickness of the dielectric layers 11 is 0.1 μm or more and 0.5 μm or less.

FIG. 5 focuses on the cross section near the external electrode 20a and the upper face of the multilayer chip 10. However, the structure is not limited. When a cross section near the external electrode 20a and the lower face of the multilayer chip 10 is focused on, the curvature radius R1 is a curvature radius of the corner portion of the cover layer 13 of the lower face of the multilayer chip 10 on the side of the external electrode 20a, in the cross section of FIG. 5. The intersection point N1 is an intersection point of the straight line L and the lowermost internal electrode layer 12 of the multilayer chip 10. The straight line M is drawn in the X-axis direction so as to contact the lower face of the multilayer chip 10.

When a cross section near the external electrode 20b and the upper face is focused on, the curvature radius R1 is a curvature radius of a corner portion of the cover layer 13 of the upper face of the multilayer chip 10 on the side of the external electrode 20b, in the cross section of FIG. 5. The straight line L is drawn by connecting edges of the internal electrode layers 12 on the side of the external electrode 20b not connected to the external electrode 20b. The intersection point N1 is an intersection of the straight line L and the uppermost internal electrode layer 12 of the multilayer chip 10. The straight line N is obtained by drawing a straight line in the Z-axis direction so as to contact the end face of the multilayer chip 10 on the side of the external electrode 20b.

When a cross section near the external electrode 20b and the lower face of the multilayer chip 10 is focused on, the curvature radius R1 is a curvature radius of a corner portion of the cover layer 13 of the lower face of the multilayer chip 10 on the side of the external electrode 20b, in the cross section of FIG. 5. The straight line L is drawn by connecting the edges of the internal electrode layers 12 on the side of the external electrode 20b not connected to the external electrode 20b. The intersection point N1 is an intersection point of the straight line L and the lowermost internal electrode layer 12 of the multilayer chip 10. The straight line M is drawn in the X-axis direction so as to contact the lower face of the multilayer chip 10.

Figure 8:
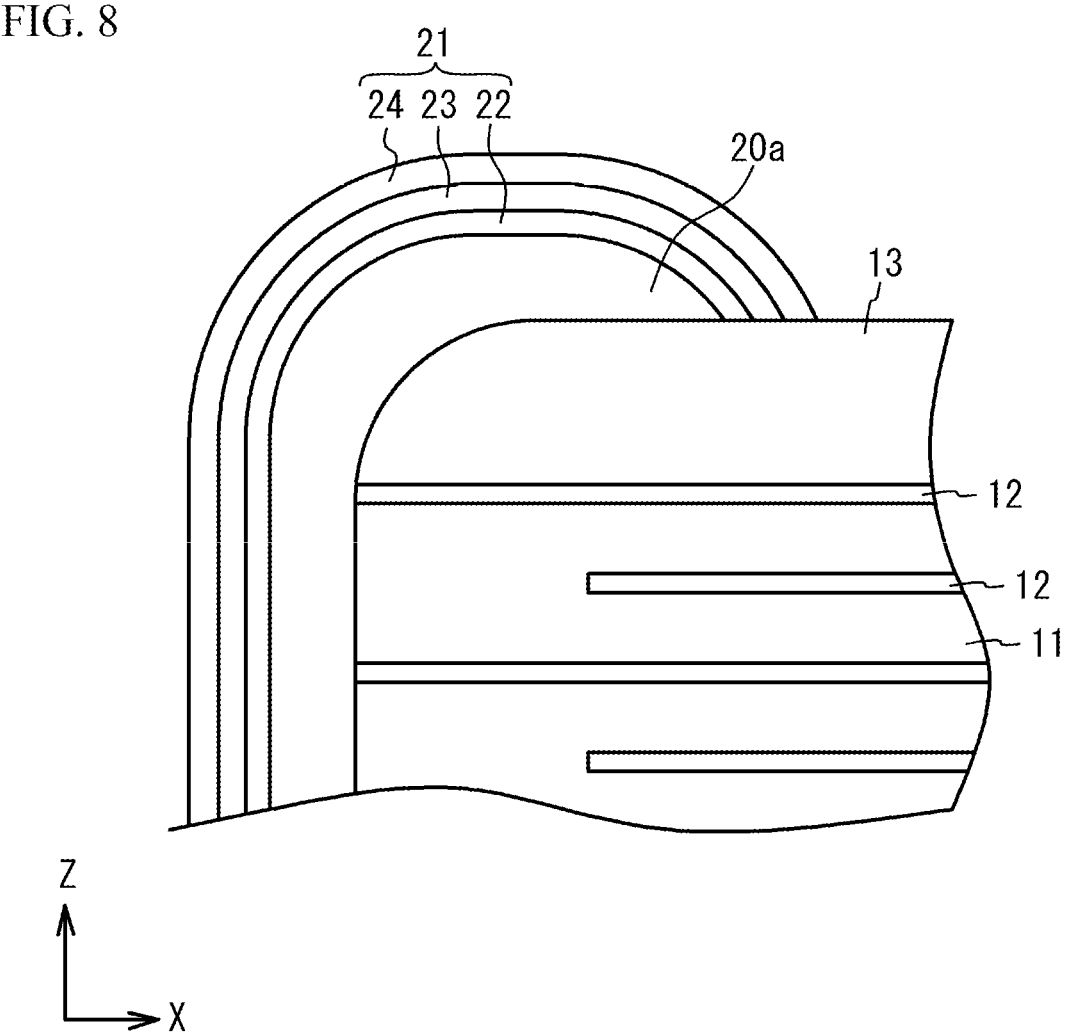
FIG. 8 illustrates a plated layer.

As illustrated in FIG. 8, a plated layer 21 may be formed on a surface of the external electrode 20a. In FIG. 8, hatch is omitted. A main component of the plated layer 21 is a metal such as Cu, Ni, Al, Zn, or Sn, or an alloy of at least two thereof. The plated layer 21 may be a plated layer of a single metal component. Alternatively, the plated layer 21 may include two or more plated layers of which a main component metal is different from each other. For example, the plated layer 21 may have a structure in which a first plated layer 22, a second plated layer 23 and a third plated layer 24 are formed in this order from the side of the external electrode 20a. The first plated layer 22 may be a Cu-plated layer. The second plated layer 23 may be a Ni-plated layer. The third plated layer 24 may be a Sn-plated layer. In FIG. 8, the external electrode 20a is illustrated. The external electrode 20b may have the same structure.

Figure 9:
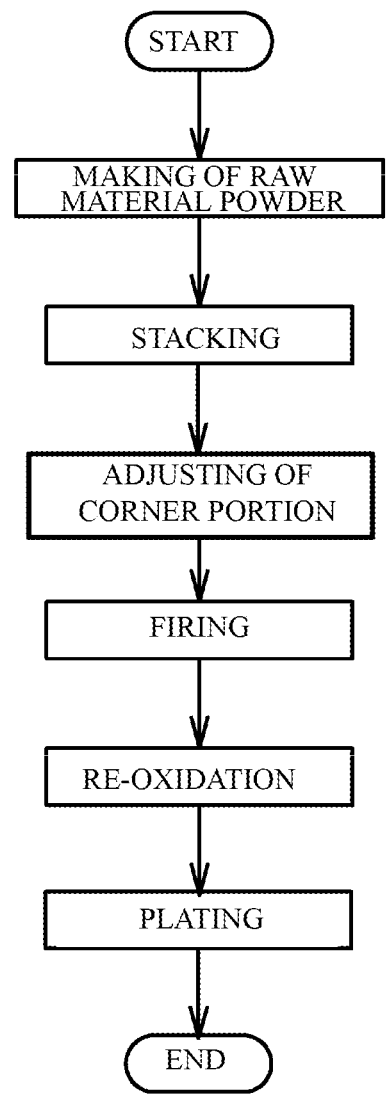
FIG. 9 illustrates a manufacturing method of a multilayer ceramic capacitor.

Next, the manufacturing method of the multilayer ceramic capacitor 100 will be described. FIG. 9 is a flowchart of the manufacturing method of the multilayer ceramic capacitor 100.

[Making of Raw Material Powder]

A dielectric material for forming the dielectric layer 11 is prepared. The dielectric material includes the main component ceramic of the dielectric layer 11. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of Zr (zirconium), Ca(calcium), Sr (strontium), Mg (magnesium), Mn (manganese), V (vanadium), Cr (chromium) or a rare earth element, or an oxide of cobalt (Co), Ni, lithium (Li), B (boron), sodium (Na), potassium 7(K) or Si, or glass.

[Stacking Process]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet 51 is applied on a base material by, for example, a die coater method or a doctor blade method, and then dried.

Figure 10A:
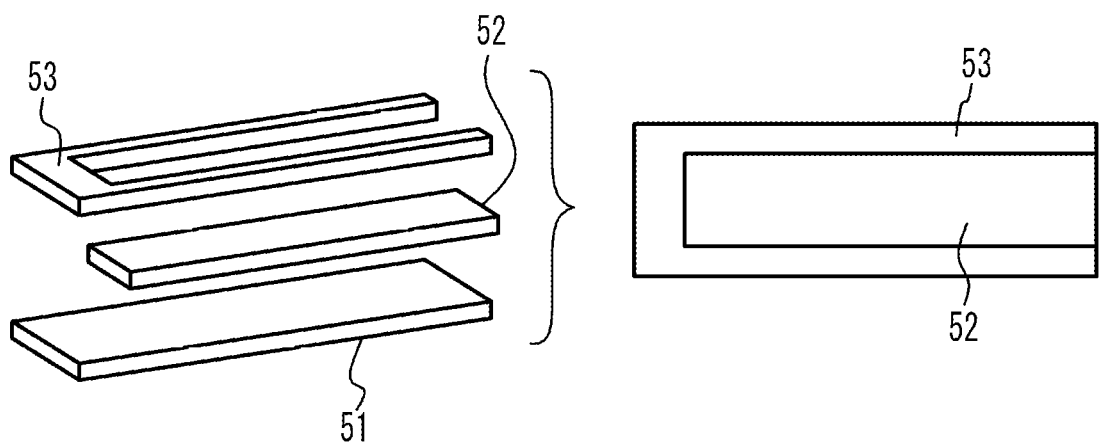
FIG. 10A and FIG. 10B illustrate a stacking process.
Figure 10B:
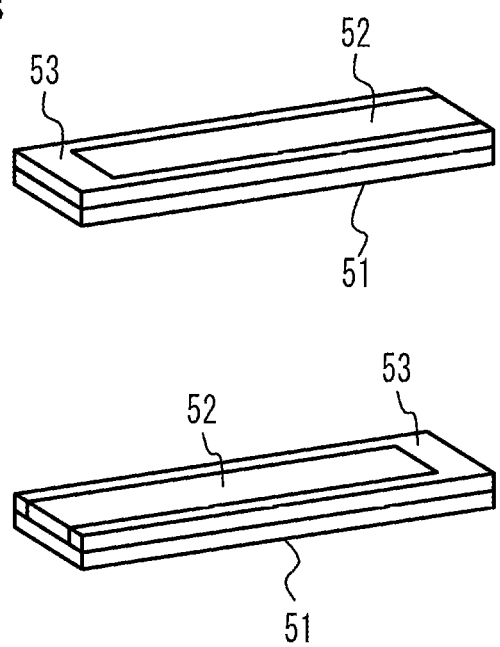

Next, as illustrated in FIG. 10A, a first pattern 52 of the internal electrode layer is formed on the surface of the dielectric green sheet 51 by printing a metal conductive paste for forming the internal electrode with use of screen printing or gravure printing. The metal conductive paste for forming the internal electrode contains an organic binder. Ceramic particles are added as a co-material to the metal conductive paste. The main component of the ceramic particles is not particularly limited, but is preferably the same as the main component ceramic of the dielectric layer 11.

Next, as illustrated in FIG. 10A, a second pattern 53 is formed by printing reverse pattern paste the peripheral region, where no first pattern 52 is printed, on the dielectric green sheet 51 to cause the second pattern 53 and the first pattern 52 to form a flat surface. The reverse pattern paste may be the same as the dielectric green sheet 51. An additive component of the reverse pattern paste may be different from that of the dielectric green sheet 51.

Thereafter, a predetermined number of the stack units (the dielectric green sheet 51, the first pattern 52 and the second pattern 53) are stacked while the base material is peeled so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes of different polarizations as illustrated in FIG. 9B.

Figure 11:
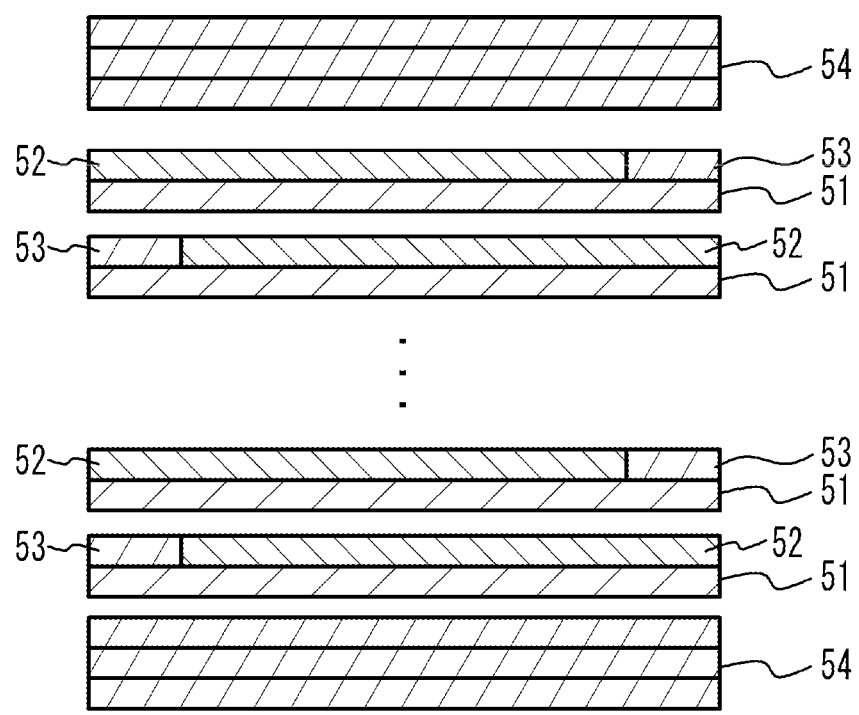
FIG. 11 illustrates a stacking process.

Next, as illustrated in FIG. 11, a predetermined number (for example, 2 to 10) cover sheet 54 (first cover sheet) are stacked on the stacked dielectric green sheets 51. A predetermined number (for example, 2 to 10) cover sheet 54 (second cover sheet) are stacked under the stacked dielectric green sheets 51. After that, the stacked structure is thermally crimped. The resulting stacked structure is stamped into a predetermined size (for example, 1.0 mm×0.5 mm). The component of the cover sheet 54 may be the same as that of the dielectric green sheet 51. The additive compound of the cover sheet 54 may be different from that of the dielectric green sheet 51. Both end faces of the resulting stacked structure are coated with metal conductive paste for the external electrodes 20a and 20b by a dipping method. Then, the metal conductive paste is dried. Thus, a ceramic multilayer structure is obtained. Instead of the method, the predetermined number of cover sheets 54 may be stacked and crimped. After that, the stacked cover sheets 54 may be affixed on the stacked dielectric green sheets 51 and under the stacked dielectric green sheets 51.

The second pattern 53 acting as the reverse pattern may not be necessarily formed on the dielectric green sheet 51.

Figure 12:
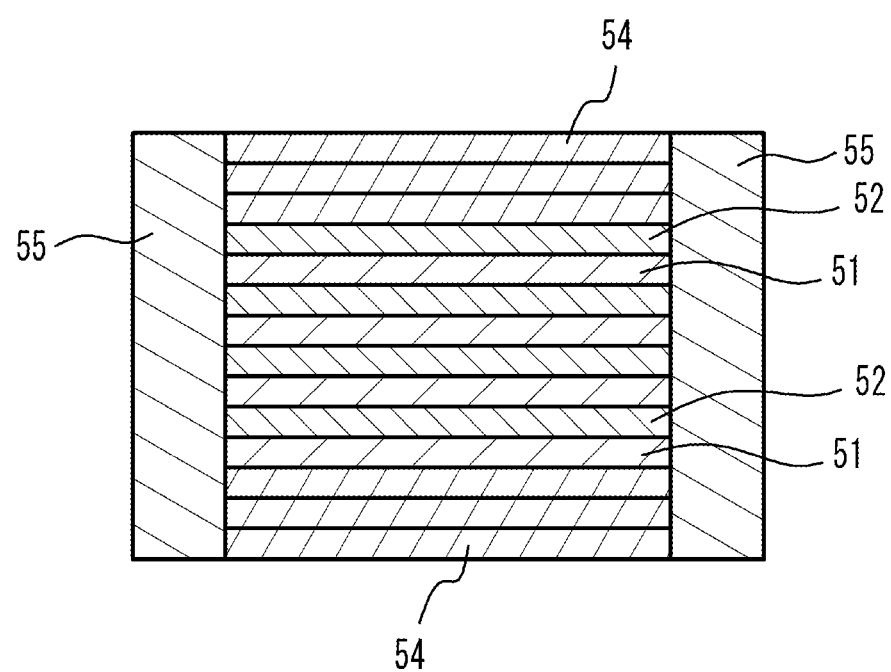
FIG. 12 illustrates a stacking process.

The multilayer portion of the second patterns 53 may be affixed after the stacking. In concrete, as illustrated in FIG. 12, the dielectric green sheets 51 and the first patterns having the same width as the dielectric green sheets 51 are alternately stacked. Thus, the multilayer portion is formed. Next, a side margin sheet 55 is affixed to the side faces of the multilayer portion. The component of the side margin sheet 55 may be the same as that of the dielectric green sheet 51. The additive compound of the side margin sheet 55 may be different from that of the dielectric green sheet 51.

[Adjusting Process of Corner Portions]

A barrel polishing is applied to the resulting ceramic multilayer structure. Thus, the corners of the ceramic multilayer structure are rounded. And, a curvature radius is formed on each of the rounded corners. When the time for performing the barrel polishing is adjusted, it is possible to form the desired curvature radius R1.

[Firing Process]

The binder is removed from the resulting ceramic multilayer structure in N2 atmosphere. After that, first paste to be the external electrodes 20a is painted by a dipping. And, second paste to be the external electrode 20b is painted by a dipping. The resulting ceramic multilayer structure is fired in a reducing atmosphere with an oxygen partial pressure of $10^{-5}$ to $10^{-8}$ atm in a temperature range of 1100° C. to 1300° C. for 10 minutes to 2 hours. Thus, the multilayer ceramic capacitor 100 is obtained.

[Re-Oxidizing Process]

Thereafter, the re-oxidizing process is performed in a N2 gas atmosphere in a temperature range of 600° C. to 1000° C.

[Plating Process]

After that, metal layers such as Cu, Ni, Sn or the like may be formed on the external electrodes 20a and 20b by plating.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Examples 1 to 16 and comparative examples 1 to 16) Slurry was obtained by kneading ceramic powder and an organic binder. A main component of the ceramic powder is barium titanate. The ceramic powder has resistance to reduction. Sheets were formed from the slurry by a doctor blade. Thus, dielectric green sheets were formed. An internal electrode pattern was formed on each of the dielectric green sheets by painting metal conductive paste of which a main component was Ni by a screen printing. Thereafter, the dielectric green sheets were stacked so that the internal electrode layers 12 and the dielectric layers 11 were alternated with each other and the end edges of the internal electrode layers 12 were alternately exposed to both edge faces in the length direction of the dielectric layer 11 so as to be alternately led out to a pair of external electrodes of different polarizations. After that, a predetermined number of covers sheets were stacked on the stacked dielectric green sheets and under the stacked dielectric green sheets, were crimped and were cut into a desired size. In this case, the stack number of the dielectric green sheets and the stack number of the cover sheets were adjusted so that the distance P1 and the distanced C1 after firing became target values. After that, the time for the barrel polishing was adjusted so that the curvature radius after the firing became a target value. After the barrel polishing and removing of the binder, conductive paste containing a co-material was applied to faces to which the internal electrode layers were exposed. The conductive paste had a predetermined size. The thickness of the circumference faces was adjusted by diluting the conductive paste. After that, a firing process was performed in a nitrogen-hydrogen atmosphere at 1250 degrees C. Thus, a thermal treating was performed. After that, a plating process was performed on the base layer of the external electrodes.

The size of the examples 1 to 4 and the comparative examples 1 to 4 was 1005 shape (length: 1.0 mm, width: 0.5 mm, height: 0.5 mm). The size of the examples 5 to 8 and the comparative examples 5 to 8 was 1608 shape (length: 1.6 mm, width: 0.8 mm, height: 0.8 mm). The size of the examples 9 to 12 and the comparative examples 9 to 12 was 2012 shape (length: 2.0 mm, width: 1.25 mm, height: 1.25 mm). The size of the example 13 to 16 and the comparative examples 13 to 16 was 3216 shape (length: 3.2 mm, width: 1.6 mm, height: 1.6 mm).

The distance C1, the distance P1 and the curvature radius R1 were measured with respect to the examples 1 to 16 and the comparative examples 1 to 16. One of two side faces of each sample was arranged upside and buried in a lateral direction. A cross section was exposed by grinding until the center of each sample. Each of the distance C1, the distance P1 and the curvature radius R1 was an average value of 10 samples.

In the example 1, the distance C1 was 24.2 μm. The distance P1 was 55.1 μm. The curvature radius R1 was 11.8 μm. $R1/\sqrt{(P1^2-C1^2)}$ was 0.24. In the example 2, the distance C1 was 25.0 μm. The distance P1 was 56.1 μm. The curvature radius R1 was 37.8 μm. $R1/\sqrt{(P1^2-C1^2)}$ was 0.75. In the example 3, the distance C1 was 148.0 μm. The distance P1 was 211.0 μm. The curvature radius R1 was 34.2 μm. $R1/\sqrt{(P1^2-C1^2)}$ was 0.23. In the example 4, the distance C1 was 149.2 μm. The distance P1 was 212.5 μm. The curvature radius R1 was 114.2 μm. $R1/\sqrt{(P1^2-C1^2)}$ was 0.76. In the example 5, the distance Ca was 40.5 μm. The distance P1 was 108.0 μm. The curvature radius R1 was 24.0 μm. $R1/\sqrt{(P1^2-C1^2)}$ was 0.24. In the example 6, the distance Ca was 38.0 μm. The distance P1 was 105.9 μm. The curvature radius R1 was 74.8 μm. $R1/\sqrt{(P1^2-C1^2)}$ was 0.76. In the example 7, the distance C1 was 247.2 μm. The distance P1 was 349.0 μm. The curvature radius R1 was 57.2 μm. $R1/\sqrt{(P1^2-C1^2)}$ was 0.23. In the example 8, the distance C1 was 247.9 μm. The distance P1 was 349.7 μm. The curvature radius R1 was 185.0 μm. $R1/\sqrt{(P1^2-C1^2)}$ was 0.75.

In the example 9, the distance C1 was 79.3 μm. The distance P1 was 260.2 μm. The curvature radius R1 was 61.8 μm. $R1/\sqrt{(P1^2-C1^2)}$ was 0.25. In the example 2, the distance C1 was 79.9 μm. The distance P1 was 262.0 μm. The curvature radius R1 was 190.0 μm. $R1/\sqrt{(P1^2-C1^2)}$ was 0.76. In the example 11, the distance C1 was 394.2 μm. The distance P1 was 553.7 μm. The curvature radius R1 was 96.8 μm. $R1/\sqrt{(P1^2-C1^2)}$ was 0.25. In the example 12, the distance C1 was 398.5 μm. The distance P1 was 557.0 μm. The curvature radius R1 was 305.1 μm. $R1/\sqrt{(P1^2-C1^2)}$ was 0.78. In the example 13, the distance C1 was 97.6 μm. The distance P1 was 313.0 μm. The curvature radius R1 was 74.0 μm. $R1/\sqrt{(P1^2-C1^2)}$ was 0.25. In the example 14, the distance C1 was 98.0 μm. The distance P1 was 313.8 μm. The curvature radius R1 was 234.3 μm. $R1/\sqrt{(P1^2-C1^2)}$ was 0.79. In the example 15, the distance C1 was 488.5 μm. The distance P1 was 700.0 μm. The curvature radius R1 was 124.8 μm. $R1/\sqrt{(P1^2-C1^2)}$ was 0.25. In the example 16, the distance C1 was 491.1 μm. The distance P1 was 705.4 μm. The curvature radius R1 was 395.8 μm. $R1/\sqrt{(P1^2-C1^2)}$ was 0.78.

In the comparative example 1, the distance C1 was 26.3 μm. The distance P1 was 56.8 μm. The curvature radius R1 was 8.1 μm. $R1/\sqrt{(P1^2-C1^2)}$ was 0.16. In the comparative example 2, the distance C1 was 25.6 μm. The distance P1 was 56.4 μm. The curvature radius R1 was 44.3 μm. $R1/\sqrt{(P1^2-C1^2)}$ was 0.88. In the comparative example 3, the distance C1 was 150.3 μm. The distance P1 was 213.4 μm. The curvature radius R1 was 20.4 μm. $R1/\sqrt{(P1^2-C1^2)}$ was 0.14. In the comparative example 4, the distance C1 was 148.7 μm. The distance P1 was 211.3 μm. The curvature radius R1 was 129.5 μm. $R1/\sqrt{(P1^2-C1^2)}$ was 0.86. In the comparative example 5, the distance C1 was 39.4 μm. The distance P1 was 106.5 μm. The curvature radius R1 was 15.3 μm. $R1/\sqrt{(P1^2-C1^2)}$ was 0.16. In the comparative example 6, the distance C1 was 39.7 μm. The distance P1 was 107.5 μm. The curvature radius R1 was 87.4 μm. $R1/\sqrt{(P1^2-C1^2)}$ was 0.88. In the comparative example 7, the distance C1 was 250.2 μm. The distance P1 was 350.1 μm. The curvature radius R1 was 35.3 μm. $R1/\sqrt{(P1^2-C1^2)}$ was 0.14. In the comparative example 8, the distance C1 was 248.9 μm. The distance P1 was 349.8 μm. The curvature radius R1 was 211.4 μm. $R1/\sqrt{(P1^2-C1^2)}$ was 0.86.

In the comparative example 9, the distance C1 was 78.5 μm. The distance P1 was 259.0 μm. The curvature radius R1 was 39.5 μm. $R1/\sqrt{(P1^2-C1^2)}$ was 0.16. In the comparative example 10, the distance C1 was 78.3 μm. The distance P1 was 258.1 μm. The curvature radius R1 was 213.4 μm. $R1/\sqrt{(P1^2-C1^2)}$ was 0.87. In the comparative example 11, the distance C1 was 396.5 μm. The distance P1 was 555.5 μm. The curvature radius R1 was 60.6 μm. $R1/\sqrt{(P1^2-C1^2)}$ was 0.16. In the comparative example 12, the distance C1 was 396.9 μm. The distance P1 was 556.6 μm. The curvature radius R1 was 339.7 μm. $R1/\sqrt{(P1^2-C1^2)}$ was 0.87. In the comparative example 13, the distance C1 was 98.5 μm. The distance P1 was 313.4 μm. The curvature radius R1 was 50.7 μm. $R1/\sqrt{(P1^2-C1^2)}$ was 0.17. In the comparative example 14, the distance C1 was 98.8 μm. The distance P1 was 314.4 μm. The curvature radius R1 was 270.3 μm. $R1/\sqrt{(P1^2-C1^2)}$ was 0.91. In the comparative example 15, the distance C1 was 489.6 μm. The distance P1 was 702.4 μm. The curvature radius R1 was 78.7 μm. $R1/\sqrt{(P1^2-C1^2)}$ was 0.16. In the comparative example 16, the distance C1 was 489.2 μm. The distance P1 was 703.4 μm. The curvature radius R1 was 464.4 μm. $R1/\sqrt{(P1^2-C1^2)}$ was 0.92.

Figure 13:
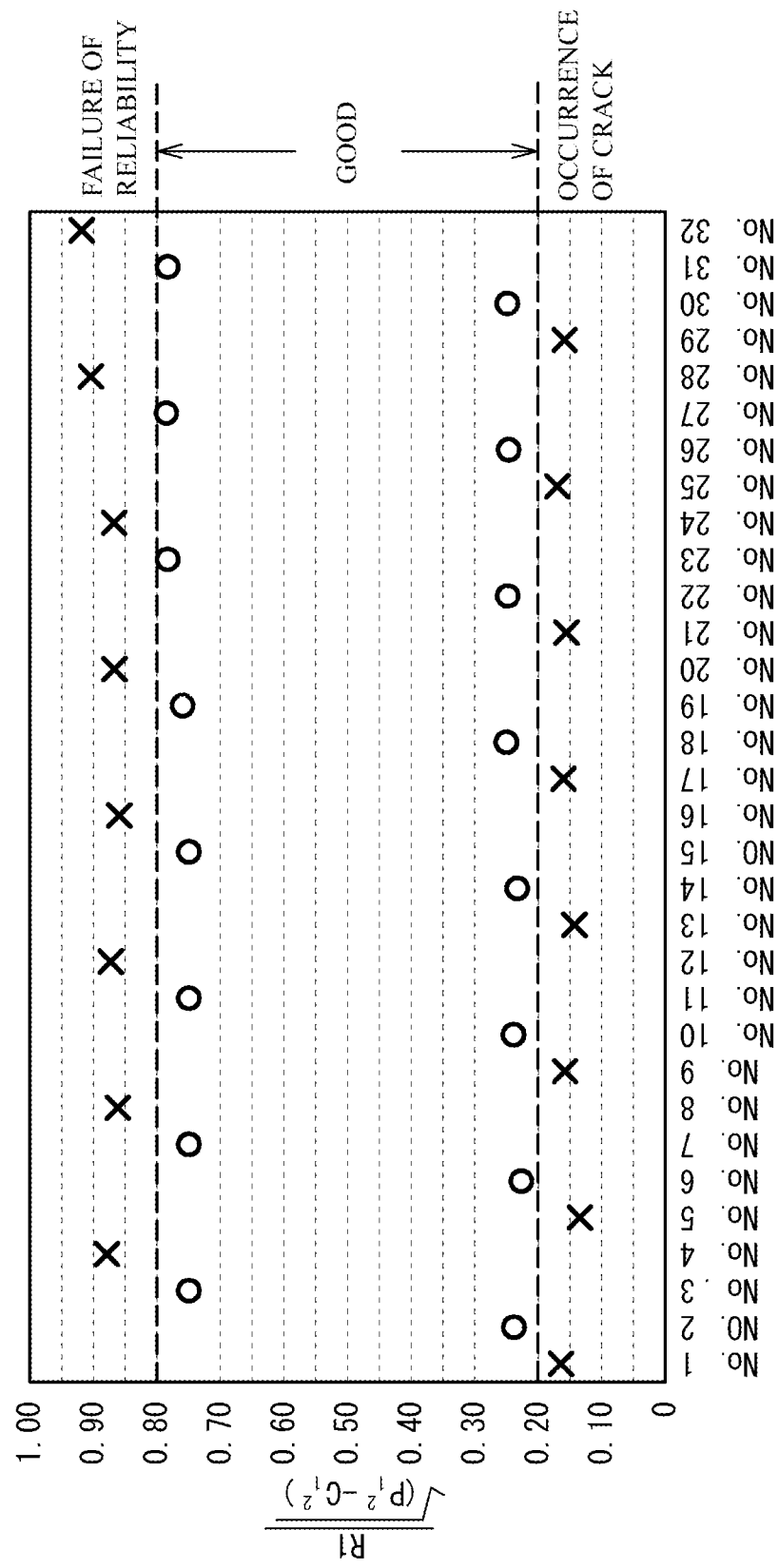
FIG. 13 illustrates plotted results of examples and comparative examples.

(Evaluation of crack) With respect to each of the examples 1 to 16 and the comparative examples 1 to 16, it was determined whether the crack occurred in 100 samples. The number of the samples in which the crack occurred was counted. Thus, an occurrence rate of crack was measured. Tables 1 and 2 show the results. As shown in Tables 1 and 2, the occurrence rate of crack was 0/100 in the examples 1 to 16. On the other hand, there were one or more samples in which the crack occurred in the comparative examples 1, 3, 5, 7, 9, 11, 13 and 15. That is, the occurrence rate of crack was 1/100 or more. FIG. 13 illustrates the results. From the plotted results of FIG. 13, it is thought that the occurrence rate of crack was 0/100 because $R1/\sqrt{(P1^2-C1^2)}$ was 0.20 or more. It is thought that this was because the distance between the corner portion B and the intersection point N1 was small. On the other hand, it is thought that the occurrence rate of crack was 1/100 or more, because $R1/\sqrt{(P1^2-C1^2)}$ was less than 0.20. It is thought that this was because the distance between the corner portion B and the intersection point N1 was large.

(Evaluation of reliability) The reliability of 200 samples was measured, with respect to each of the examples 1 to 16 and the comparative examples 1 to 16. In concrete, a rated voltage was applied between the external electrodes of the samples, and the samples were kept 1000 hours in a moisture-resistant chamber. When an IR value of a sample was less than a threshold, the reliability of the sample was determined as bad. When the IR value of a sample was the threshold or more, the reliability of the sample was determined as good. The number of the samples of which the reliability was determined as bad was counted. Thus, a failure rate of the reliability was measured. Tables 1 and 2 show the results. As shown in Tables 1 and 2, the failure rate of the reliability was 0/200 in the examples 1 to 16. On the other hand, there were one or more samples of which the reliability was determined as bad, in the comparative examples 2, 4, 6, 8, 10, 12, 14 and 16. That is, the failure rate of the reliability was 1/200 or more. FIG. 13 illustrates the results. From the plotted results of FIG. 13, it is thought that the failure rate of the reliability was 0/200 because $R1/\sqrt{(P1^2-C1^2)}$ was 0.80 or less. It is thought that this was because the distance between the corner portion B and the intersection point N1 was secured and the resistance to humidity was improved. On the other hand, it is thought that the failure rate of the reliability was 1/200 or more because $R1/\sqrt{(P1^2-C1^2)}$ was more than 0.80. It is thought that this was because the distance between the corner portion B and the intersection point N1 was not sufficient.

(Total determination) When the failure rate of the crack was 0/100 and the failure rate of the reliability was 0/200, total determination was "good". When the failure rate of the crack was 1/100 or more and/or the failure rate of the reliability was 1/200 or more, the total determination was "bad". Tables 1 and 2 show the results. As shown in table 1, the total determination of the examples 1 to 16 was "good". It is thought that this was because the relationship of $0.20 \leq R1/\sqrt{(P1^2-C1^2)} \leq 0.80$ was satisfied. The total determination of the comparative examples 1 to 16 was "bad". It is thought that this was because the relationship of $0.20 \leq R1/\sqrt{(P1^2-C1^2)} \leq 0.80$ was not satisfied.

(Evaluation of plating characteristic) Plating characteristic was evaluated with respect to each of the examples 1 to 16 and the comparative examples 1 to 16. The samples of the examples 1 to 16 and the comparative examples 1 to 16 were observed by an optical microscope with a magnitude of 100. When discontinuity did not occur on the corner portions B and the corner portions B were covered with the plated layer, the plating characteristic was determined as good. When the discontinuity occurred in the plated layer on the corner portions B, the plating characteristic was determined as bad. Tables 1 and 2 show the results. As shown in Tables 1 and 2, the plating characteristic of the examples 1 to 16 and the comparative examples 1 to 16 were determined as good. It is thought that this was because no inflection point (level difference) was formed in the external electrodes and the thickness of the external electrode on the corner portion was sufficient.

TABLE 1

| | | CHIP SIZE | C1 (μm) | P1 (μm) | R1 (μm) |
|---|---|---|---|---|---|
| No. 1 | EXAMPLE 1 | 1005 | 24.2 | 55.1 | 11.8 |
| No. 2 | EXAMPLE 2 | 1005 | 25.0 | 56.1 | 37.8 |
| No. 3 | EXAMPLE 3 | 1005 | 148.0 | 211.0 | 34.2 |
| No. 4 | EXAMPLE 4 | 1005 | 149.2 | 212.5 | 114.2 |
| No. 5 | EXAMPLE 5 | 1608 | 40.5 | 108.0 | 24.0 |
| No. 6 | EXAMPLE 6 | 1608 | 38.0 | 105.9 | 74.8 |
| No. 7 | EXAMPLE 7 | 1608 | 247.2 | 349.0 | 57.2 |
| No. 8 | EXAMPLE 8 | 1608 | 247.9 | 349.7 | 185.0 |
| No. 9 | EXAMPLE 9 | 2012 | 79.3 | 260.2 | 61.8 |
| No. 10 | EXAMPLE 10 | 2012 | 79.9 | 262.0 | 190.0 |
| No. 11 | EXAMPLE 11 | 2012 | 394.2 | 553.7 | 96.8 |
| No. 12 | EXAMPLE 12 | 2012 | 398.5 | 557.0 | 305.1 |
| No. 13 | EXAMPLE 13 | 3216 | 97.6 | 313.0 | 74.0 |
| No. 14 | EXAMPLE 14 | 3216 | 98.0 | 313.8 | 234.3 |
| No. 15 | EXAMPLE 15 | 3216 | 488.5 | 700.0 | 124.8 |
| No. 16 | EXAMPLE 16 | 3216 | 491.1 | 705.4 | 395.8 |
| No. 17 | COMPARATIVE EXAMPLE 1 | 1005 | 26.3 | 56.8 | 8.1 |
| No. 18 | COMPARATIVE EXAMPLE 2 | 1005 | 25.6 | 56.4 | 44.3 |
| No. 19 | COMPARATIVE EXAMPLE 3 | 1005 | 150.3 | 213.4 | 20.4 |
| No. 20 | COMPARATIVE EXAMPLE 4 | 1005 | 148.7 | 211.3 | 129.5 |
| No. 21 | COMPARATIVE EXAMPLE 5 | 1608 | 39.4 | 106.5 | 15.3 |
| No. 22 | COMPARATIVE EXAMPLE 6 | 1608 | 39.7 | 107.5 | 87.4 |
| No. 23 | COMPARATIVE EXAMPLE 7 | 1608 | 250.2 | 350.1 | 35.3 |
| No. 24 | COMPARATIVE EXAMPLE 8 | 1608 | 248.9 | 349.8 | 211.4 |
| No. 25 | COMPARATIVE EXAMPLE 9 | 2012 | 78.5 | 259.0 | 39.5 |
| No. 26 | COMPARATIVE EXAMPLE 10 | 2012 | 78.3 | 258.1 | 213.4 |
| No. 27 | COMPARATIVE EXAMPLE 11 | 2012 | 396.5 | 555.5 | 60.6 |
| No. 28 | COMPARATIVE EXAMPLE 12 | 2012 | 396.9 | 556.6 | 339.7 |
| No. 29 | COMPARATIVE EXAMPLE 13 | 3216 | 98.5 | 313.4 | 50.7 |
| No. 30 | COMPARATIVE EXAMPLE 14 | 3216 | 98.8 | 314.4 | 270.3 |
| No. 31 | COMPARATIVE EXAMPLE 15 | 3216 | 489.6 | 702.4 | 78.7 |
| No. 32 | COMPARATIVE EXAMPLE 16 | 3216 | 489.2 | 703.4 | 464.4 |

TABLE 2

| | | $R1/\sqrt{(P1^2 - C1^2)}$ | CRACK | RELIABILITY | DETERMINATION | PLATING |
|---|---|---|---|---|---|---|
| No. 1 | EXAMPLE 1 | 0.24 | 0/100 | 0/200 | ○ | 0/100 |
| No. 2 | EXAMPLE 2 | 0.75 | 0/100 | 0/200 | ○ | 0/100 |
| No. 3 | EXAMPLE 3 | 0.23 | 0/100 | 0/200 | ○ | 0/100 |
| No. 4 | EXAMPLE 4 | 0.76 | 0/100 | 0/200 | ○ | 0/100 |
| No. 5 | EXAMPLE 5 | 0.24 | 0/100 | 0/200 | ○ | 0/100 |
| No. 6 | EXAMPLE 6 | 0.76 | 0/100 | 0/200 | ○ | 0/100 |
| No. 7 | EXAMPLE 7 | 0.23 | 0/100 | 0/200 | ○ | 0/100 |
| No. 8 | EXAMPLE 8 | 0.75 | 0/100 | 0/200 | ○ | 0/100 |
| No. 9 | EXAMPLE 9 | 0.25 | 0/100 | 0/200 | ○ | 0/100 |
| No. 10 | EXAMPLE 10 | 0.76 | 0/100 | 0/200 | ○ | 0/100 |
| No. 11 | EXAMPLE 11 | 0.25 | 0/100 | 0/200 | ○ | 0/100 |
| No. 12 | EXAMPLE 12 | 0.78 | 0/100 | 0/200 | ○ | 0/100 |
| No. 13 | EXAMPLE 13 | 0.25 | 0/100 | 0/200 | ○ | 0/100 |
| No. 14 | EXAMPLE 14 | 0.79 | 0/100 | 0/200 | ○ | 0/100 |
| No. 15 | EXAMPLE 15 | 0.25 | 0/100 | 0/200 | ○ | 0/100 |
| No. 16 | EXAMPLE 16 | 0.78 | 0/100 | 0/200 | ○ | 0/100 |

TABLE 2-continued

| | | R1/√(P1² − C1²) | CRACK | RELIABILITY | DETERMINATION | PLATING |
|---|---|---|---|---|---|---|
| No. 17 | COMPARATIVE EXAMPLE 1 | 0.16 | 2/100 | 0/200 | X | 0/100 |
| No. 18 | COMPARATIVE EXAMPLE 2 | 0.88 | 0/100 | 3/200 | X | 0/100 |
| No. 19 | COMPARATIVE EXAMPLE 3 | 0.14 | 7/100 | 0/200 | X | 0/100 |
| No. 20 | COMPARATIVE EXAMPLE 4 | 0.86 | 0/100 | 1/200 | X | 0/100 |
| No. 21 | COMPARATIVE EXAMPLE 5 | 0.16 | 4/100 | 0/200 | X | 0/100 |
| No. 22 | COMPARATIVE EXAMPLE 6 | 0.88 | 0/100 | 5/200 | X | 0/100 |
| No. 23 | COMPARATIVE EXAMPLE 7 | 0.14 | 7/100 | 0/200 | X | 0/100 |
| No. 24 | COMPARATIVE EXAMPLE 8 | 0.86 | 0/100 | 3/200 | X | 0/100 |
| No. 25 | COMPARATIVE EXAMPLE 9 | 0.16 | 5/100 | 0/200 | X | 0/100 |
| No. 26 | COMPARATIVE EXAMPLE 10 | 0.87 | 0/100 | 6/200 | X | 0/100 |
| No. 27 | COMPARATIVE EXAMPLE 11 | 0.16 | 8/100 | 0/200 | X | 0/100 |
| No. 28 | COMPARATIVE EXAMPLE 12 | 0.87 | 0/100 | 3/200 | X | 0/100 |
| No. 29 | COMPARATIVE EXAMPLE 13 | 0.17 | 10/100 | 0/200 | X | 0/100 |
| No. 30 | COMPARATIVE EXAMPLE 14 | 0.91 | 0/100 | 5/200 | X | 0/100 |
| No. 31 | COMPARATIVE EXAMPLE 15 | 0.16 | 15/100 | 0/200 | X | 0/100 |
| No. 32 | COMPARATIVE EXAMPLE 16 | 0.92 | 0/100 | 4/200 | X | 0/100 |

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip comprising a multilayer structure, a first cover layer and a second cover layer and having a parallelepiped shape, the multilayer structure having a structure in which each of a plurality of dielectric layers and each of a plurality of internal electrode layers are alternately stacked and are alternately exposed to a first end face and a second end face of the multilayer chip, the first end face being opposite to the second end face, the first cover layer being provided on an upper face of the multilayer structure in a stacking direction, the second cover layer being provided on a lower face of the multilayer structure;
a first external electrode formed on the first end face; and
a second external electrode formed on the second end face,
wherein a relationship of $0.20 \leq R1/\sqrt{(P1^2-C1^2)} \leq 0.80$ is satisfied when a direction in which the first end face is opposite to the second end face is an X-axis direction, the stacking direction is a Z-axis direction, and a direction vertical to the X-axis direction and the Z-axis direction is a Y-axis direction, a curvature radius of a corner portion of the first cover layer on a side of the first external electrode in a cross section in a XZ-plane passing through a center in the Y-axis direction of the multilayer chip is a curvature radius R1, a straight line obtained by connecting edges of internal electrode layers on a side of the first external electrode not connected to the first external electrode is a straight line L, an intersection of the straight line L and an internal electrode layer that is closest to the first cover layer is an intersection point N1, a straight line drawn in the X-axis direction so as to contact an upper face of the multilayer chip is a straight line M, a straight line drawn in the Z-axis direction so as to contact the first end face is a straight line N, an intersection point of the straight line M and the straight line N is an intersection point O, a minimum distance between the intersection point N1 and the straight line M is a distance C1 and a minimum distance between the intersection point N1 and the intersection point O is a distance P1.

2. The ceramic electronic device as claimed in claim 1, wherein the curvature radius R1, the distance C1 and the distance P1 satisfy a relationship of $0.25 \leq R1/\sqrt{(P1^2-C1^2)} \leq 0.75$.

3. The ceramic electronic device as claimed in claim 1, wherein a surface of the first external electrode has no inflection point,
wherein a plated layer is provided on the surface of the first external electrode.

4. The ceramic electronic device as claimed in claim 1, wherein the curvature radius R1 is 1% or more and 15% or less of a longitudinal size of the multilayer chip.

5. The ceramic electronic device as claimed in claim 1, wherein the distance C1 is 3% or more and 35% or less of a size of the multilayer chip in a height direction.

6. The ceramic electronic device as claimed in claim 1, wherein the distance P1 is 10% or more and 45% or less of a size of the multilayer chip in a height direction.

7. A manufacturing method of a ceramic electronic device comprising:
forming a ceramic multilayer structure having a parallelepiped shape, by stacking a plurality of pattern-formed sheets in each of which a conductive paste for forming internal electrode layers is printed on a dielectric green sheet including ceramic, each of a plurality of conductive pastes for forming internal electrode layers being alternately exposed to a first end face and a second end face of the ceramic multilayer structure, and by providing a first cover sheet including ceramic on an upper face of the ceramic multilayer structure in a stacking direction of the ceramic multilayer structure and providing a second cover sheet including ceramic on a lower face of the ceramic multilayer structure;
polishing corner portions of the ceramic multilayer structure;
painting a first conductive paste for forming the first external electrode on the first end face;
painting a second conductive paste for forming the second external electrode on the second end face;
forming a dielectric layer from the dielectric green sheet, an internal electrode layer from the conductive paste for forming internal electrode layers, a first cover layer from the first cover sheet, a second cover layer from the second cover sheet, a first external electrode from the first conductive paste for forming the first external electrode, and a second external electrode from the second conductive paste for forming the second external electrode by firing the ceramic multilayer structure, the first conductive paste for forming the first external electrode and the second conductive paste for forming the second external electrode, wherein the corner portions of the ceramic multilayer structure are polished so that a relationship of $0.20 \leq R1/\sqrt{(P1^2-C1^2)} \leq 0.80$ is satisfied when a direction in which the first end face is opposite to the second end face is an X-axis direction, a stacking direction is a Z-axis direction, and a direction vertical to the X-axis direction and the Z-axis direction is a Y-axis direction, a curvature radius of a corner portion of the first cover layer on a side of the first external electrode in a cross section in a XZ-plane passing through a center in the Y-axis direction of a multilayer chip formed from the ceramic multilayer structure is a curvature radius R1, a straight line obtained by connecting edges of internal electrode layers on a side of the first external electrode not connected to the first external electrode is a straight line L, an intersection of the straight line L and an internal electrode layer that is closest to the first cover layer is an intersection point N1, a straight line drawn in the X-axis direction so as to contact an upper face of the multilayer chip is a straight line M, a straight line drawn in the Z-axis direction so as to contact the first end face is a straight line N, an intersection point of the straight line M and the straight line N is an intersection point O, a minimum distance between the intersection point N1 and the straight line M is a distance C1 and a minimum distance between the intersection point N1 and the intersection point O is a distance P1.

* * * * *